United States Patent
Hilbrandie et al.

(10) Patent No.: US 10,024,677 B2
(45) Date of Patent: *Jul. 17, 2018

(54) METHOD OF PROCESSING POSITIONING DATA

(71) Applicant: TomTom Traffic B.V., Amsterdam (NL)

(72) Inventors: Geert Hilbrandie, Amsterdam (NL); Ralf-Peter Schaefer, Berlin (DE); Peter Mieth, Berlin (DE); Ian Malcolm Atkinson, Edinburgh (GB); Martin Wolf, Veenendaal (NL); Ben Rutten, Delft (NL)

(73) Assignee: TOMTOM TRAFFIC B.V., Amsterdam (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/602,877

(22) Filed: Jan. 22, 2015

(65) Prior Publication Data
US 2015/0308847 A1    Oct. 29, 2015

Related U.S. Application Data

(63) Continuation of application No. 12/734,256, filed as application No. PCT/EP2008/064318 on Oct. 22, 2008, now Pat. No. 8,958,983.
(Continued)

(51) Int. Cl.
*G01C 21/34* (2006.01)
*G08G 1/01* (2006.01)
(Continued)

(52) U.S. Cl.
CPC ......... *G01C 21/3492* (2013.01); *G01C 21/32* (2013.01); *G08G 1/0104* (2013.01);
(Continued)

(58) Field of Classification Search
CPC .. G01C 21/32; G01C 21/3492; G08G 1/0104; G08G 1/0129; G08G 1/052;
(Continued)

(56) References Cited

U.S. PATENT DOCUMENTS

| 5,913,917 A | 6/1999 | Murphy |
| 5,933,100 A | 8/1999 | Golding |

(Continued)

FOREIGN PATENT DOCUMENTS

| CN | 1749696 A | 3/2006 |
| CN | 1773566 A | 5/2006 |

(Continued)

OTHER PUBLICATIONS

International Search Report dated Feb. 18, 2009 for International Application No. PCT/EP2008/064317.
(Continued)

*Primary Examiner* — Khoi H Tran
*Assistant Examiner* — Robert T Nguyen

(57) ABSTRACT

A server arranged to process GPS data to generate enhanced map data is disclosed, and comprises a plurality of navigable segments representing segments of a navigable route in an area covered by a map, the server connected with a wireless telecommunications transceiver arranged to receive GPS fixes by wireless telecommunication from a plurality of navigation devices and send the received GPS fixes to the server, the server comprising a processor arranged to generate at least one speed profile for each segment from the GPS fixes from at least two of the plurality of navigation devices, each speed profile comprising an expected speed of travel through the segment, and the server arranged to subsequently cause the transceiver to send the speed profiles to the navigation devices.

19 Claims, 6 Drawing Sheets

US 10,024,677 B2

Page 2

Related U.S. Application Data

(60) Provisional application No. 60/996,050, filed on Oct. 26, 2007, provisional application No. 60/996,052, filed on Oct. 26, 2007.

(51) Int. Cl.
*G08G 1/052* (2006.01)
*G01C 21/32* (2006.01)
*G08G 1/0968* (2006.01)

(52) U.S. Cl.
CPC ........... *G08G 1/0129* (2013.01); *G08G 1/052* (2013.01); *G08G 1/096827* (2013.01); *G08G 1/096844* (2013.01); *G08G 1/096888* (2013.01)

(58) Field of Classification Search
CPC ....... G08G 1/096827; G08G 1/096844; G08G 1/096888
USPC .................................................. 701/119, 414
See application file for complete search history.

(56) References Cited

U.S. PATENT DOCUMENTS

| | | | |
|---|---|---|---|
| 6,012,013 A | 1/2000 | McBurney | |
| 6,122,593 A | 9/2000 | Friederich et al. | |
| 6,178,374 B1 | 1/2001 | Mohlenkamp et al. | |
| 6,181,020 B1 | 1/2001 | Uchida et al. | |
| 6,188,943 B1 | 2/2001 | Uchida et al. | |
| 6,317,686 B1 | 11/2001 | Ran | |
| 6,401,027 B1 | 6/2002 | Xu et al. | |
| 6,567,744 B1 | 5/2003 | Katayama et al. | |
| 6,587,777 B1* | 7/2003 | St. Pierre | G08G 1/096716 455/45 |
| 6,615,130 B2 | 9/2003 | Myr | |
| 6,621,452 B2 | 9/2003 | Knockeart et al. | |
| 6,707,421 B1 | 3/2004 | Drury et al. | |
| 6,812,888 B2 | 11/2004 | Drury et al. | |
| 6,950,743 B2 | 9/2005 | Kainuma et al. | |
| 6,990,401 B2 | 1/2006 | Neiss et al. | |
| 7,050,903 B1 | 5/2006 | Shutter et al. | |
| 7,079,946 B2 | 7/2006 | Hunzinger | |
| 7,181,344 B2 | 2/2007 | Lehmann et al. | |
| 7,188,026 B2 | 3/2007 | Tzamaloukas | |
| 7,266,443 B2 | 9/2007 | Hirose | |
| 7,289,039 B2 | 10/2007 | Kato et al. | |
| 7,355,528 B2 | 4/2008 | Yamane et al. | |
| 7,366,606 B2 | 4/2008 | Uyeki | |
| 7,375,649 B2 | 5/2008 | Gueziec | |
| 7,499,949 B2 | 3/2009 | Barton | |
| 7,516,041 B2 | 4/2009 | Smartt et al. | |
| 7,536,254 B2 | 5/2009 | Kumagai et al. | |
| 7,609,176 B2 | 10/2009 | Yamane | |
| 7,630,986 B1 | 12/2009 | Herz et al. | |
| 7,680,596 B2 | 3/2010 | Uyeki et al. | |
| 7,698,061 B2 | 4/2010 | Singh | |
| 7,706,964 B2 | 4/2010 | Horvitz et al. | |
| 7,739,041 B2 | 6/2010 | Chang | |
| 7,774,121 B2 | 8/2010 | Lee et al. | |
| 7,840,326 B1 | 11/2010 | Yamada | |
| 7,912,627 B2 | 3/2011 | Downs et al. | |
| 7,957,893 B2 | 6/2011 | Smartt | |
| 8,063,755 B2 | 11/2011 | Eikelenberg et al. | |
| 8,332,132 B2 | 12/2012 | Groenhuijzen et al. | |
| 8,358,224 B2 | 1/2013 | Seder et al. | |
| 8,395,529 B2 | 3/2013 | Seder et al. | |
| 8,428,335 B2 | 4/2013 | Ge et al. | |
| 8,626,437 B2 | 1/2014 | Yun | |
| 8,958,983 B2* | 2/2015 | Hilbrandie | G01C 21/32 701/400 |
| 2001/0029425 A1 | 10/2001 | Myr | |
| 2003/0187573 A1* | 10/2003 | Agnew | G01C 21/3492 701/414 |
| 2004/0030670 A1 | 2/2004 | Barton | |
| 2004/0034467 A1 | 2/2004 | Sampedro et al. | |
| 2004/0039523 A1 | 2/2004 | Kainuma et al. | |
| 2004/0104842 A1 | 6/2004 | Drury et al. | |
| 2004/0193365 A1 | 9/2004 | Kokojima | |
| 2004/0230373 A1 | 11/2004 | Tzamaloukas | |
| 2005/0027434 A1 | 2/2005 | Hirose | |
| 2005/0093720 A1 | 5/2005 | Yamane et al. | |
| 2005/0206534 A1 | 9/2005 | Yamane | |
| 2005/0222751 A1 | 10/2005 | Uyeki | |
| 2005/0222756 A1 | 10/2005 | Davis | |
| 2005/0222764 A1 | 10/2005 | Uyeki et al. | |
| 2006/0064239 A1 | 3/2006 | Ishii | |
| 2006/0106531 A1* | 5/2006 | Nagase | G08G 1/0104 701/532 |
| 2006/0178807 A1 | 8/2006 | Kato et al. | |
| 2006/0206256 A1 | 9/2006 | Kumagai et al. | |
| 2007/0038362 A1 | 2/2007 | Gueziec | |
| 2007/0106465 A1 | 5/2007 | Adam et al. | |
| 2007/0150375 A1* | 6/2007 | Yang | G06Q 10/08 705/339 |
| 2007/0208496 A1 | 9/2007 | Downs et al. | |
| 2007/0208501 A1 | 9/2007 | Downs et al. | |
| 2008/0004789 A1 | 1/2008 | Horvitz et al. | |
| 2008/0234921 A1 | 9/2008 | Groenhuijzen et al. | |
| 2008/0275629 A1* | 11/2008 | Yun | G01C 21/3492 701/118 |
| 2009/0287405 A1 | 11/2009 | Liu et al. | |
| 2009/0292458 A1* | 11/2009 | Nakamura | G01C 21/32 701/532 |
| 2009/0306884 A1 | 12/2009 | Mueller | |
| 2010/0057346 A1 | 3/2010 | Ehrlacher | |
| 2010/0253541 A1 | 10/2010 | Seder et al. | |
| 2010/0253542 A1 | 10/2010 | Seder et al. | |
| 2011/0055210 A1 | 3/2011 | Meredith et al. | |
| 2011/0178698 A1 | 7/2011 | Aben | |
| 2011/0264365 A1 | 10/2011 | Singh | |
| 2012/0046860 A1 | 2/2012 | Curtis | |
| 2012/0143886 A1 | 6/2012 | Okude | |
| 2012/0239607 A1 | 9/2012 | Rao | |
| 2013/0013203 A1 | 1/2013 | Sumizawa | |
| 2013/0150087 A1 | 6/2013 | Kosuru | |
| 2013/0158845 A1 | 6/2013 | Davis | |
| 2013/0304379 A1* | 11/2013 | Fulger | G01C 21/3415 701/533 |
| 2014/0012494 A1 | 1/2014 | Cudak | |
| 2014/0046591 A1 | 2/2014 | Boldyrev | |
| 2018/0025638 A1* | 1/2018 | Fulger | G08G 1/096775 |

FOREIGN PATENT DOCUMENTS

| | | |
|---|---|---|
| CN | 1879008 A | 12/2006 |
| CN | 1956566 A | 5/2007 |
| CN | 1963847 A | 5/2007 |
| DE | 10037827 A1 | 2/2002 |
| DE | 102006010572 A1 | 9/2007 |
| EP | 1005627 B1 | 10/2003 |
| EP | 1503355 A1 | 2/2005 |
| EP | 1657692 A | 5/2006 |
| EP | 1840519 A2 | 10/2007 |
| EP | 2017640 A1 | 1/2009 |
| FR | 2900728 A1 | 11/2007 |
| GB | 2431261 A | 4/2007 |
| JP | H7129893 A | 5/1995 |
| JP | H10141975 | 5/1998 |
| JP | 2002117491 A | 4/2002 |
| JP | 2005017151 A | 1/2005 |
| JP | 2005038447 A | 2/2005 |
| JP | 2006184084 A * | 7/2006 |
| JP | 2006293876 | 10/2006 |
| JP | 2007106206 A | 4/2007 |
| JP | 2007207083 | 8/2007 |
| JP | 2007248347 A | 9/2007 |
| JP | 2010210284 | 9/2009 |
| JP | 2009229294 | 10/2009 |
| JP | 2011502298 | 1/2011 |
| JP | 2011252767 | 12/2011 |
| RU | 2270480 C2 | 2/2006 |
| TW | 200712529 A | 4/2007 |

(56) References Cited

FOREIGN PATENT DOCUMENTS

| | | |
|---|---|---|
| TW | 200737058 A | 10/2007 |
| WO | 9909374 A1 | 2/1999 |
| WO | 0201532 A1 | 1/2002 |
| WO | 2007042796 A1 | 4/2007 |

OTHER PUBLICATIONS

International Search Report dated Feb. 4, 2009 for International Application No. PCT/EP2008/064318.
International Search Report dated Feb. 11, 2009 for International Application No. PCT/EP2008/064319.
International Search Report dated Mar. 23, 2009 for International Application No. PCT/EP2008/064320.
International Search Report dated Feb. 4, 2009 for International Application No. PCT/EP2008/064322.
International Search Report dated Mar. 23, 2009 for International Application No. PCT/EP2008/064323.
Bekir, Bailin, A Clustering Based Methodology For Determining the Optical Roadway Configuration of Detectors for Travel Time Estimation, Transportation Research Board 2007 Annual Meeting, Submitted to the 86th Transportation Research Board Annual Meeting, Aug. 1, 2006, found online at www.rits.rutgers.edu/files/clusteringpaper.pdf, see pp. 1-13.
Standard Deviation Definition, 2pages, May 8, 2005 available online @ http://web.archive.org/web/20050208112010/http://www.chemicool.com/definition/standard_deviation.html, last accessed Jun. 5, 2012.
A Tutorial on Clustering Algorithms, 3pages, dated Aug. 11, 2007 via wayback machine, available online @ http://web.archive.org/web/20070811043338/http://home.dei.polimi.it/matteucc/Clustering/tutorial_html/, last accessed Jun. 5, 2012.

\* cited by examiner

METHOD OF PROCESSING POSITIONING DATA

CROSS-REFERENCE TO RELATED APPLICATIONS

This application is a continuation application of U.S. patent application Ser. No. 12/734,256, which claims the benefit of International (PCT) Application No. PCT/EP2008/064318 filed 22 Oct. 2008, and which claims priority from U.S. Provisional Patent Application Nos. 60/996,050 and 60/996,052, both filed 26 Oct. 2007. The entire content of each of these applications is incorporated herein by reference.

FIELD OF THE INVENTION

The invention relates to a method of processing positioning data and in particular to processing positioning data in order to generate map data arranged to be used in navigation devices and in particular, but not especially in a Portable Navigation Device (PND). The invention also provides related apparatus for providing the method.

BACKGROUND OF THE INVENTION

Map data for electronic navigation devices, such as GPS based personal navigation devices like the GO™ from TomTom International BV, comes from specialist map vendors such as Tele Atlas NV. Such devices are also referred to as Portable Navigation Devices (PND's). This map data is specially designed to be used by route guidance algorithms, typically using location data from the GPS system. For example, roads can be described as lines—i.e. vectors (e.g. start point, end point, direction for a road, with an entire road being made up of many hundreds of such segments, each uniquely defined by start point/end point direction parameters). A map is then a set of such road vectors, data associated with each vector (speed limit; travel direction, etc.) plus points of interest (POIs), plus road names, plus other geographic features like park boundaries, river boundaries, etc., all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas starts with basic road information from various sources, such as the Ordnance Survey for roads in England. It also has a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published four times a year to device manufacturers like TomTom.

Each such road segment has associated therewith a speed parameter for that road segment which gives an indication of the speed at which a vehicle can travel along that segment and is an average speed generated by the party that produced the map data, which may be, for example, Tele Atlas. The speed parameter is used by route planning algorithms on PND's on which the map is processed. The accuracy of such route planning thus depends on the accuracy of the speed parameter. For example, a user is often presented with an option on his/her PND to have it generate the fastest route between the current location of the device and a destination. The route calculated by the PND may well not be the fastest route if the speed parameters are inaccurate.

It is known that parameters such as density of traffic can significantly effect the speed profile of a segment of road and such speed profile variations mean that the quickest route between two points may not remain the same. Inaccuracies in the speed parameter of a road segment can also lead to inaccurate Estimated Times of Arrival (ETA) as well as selection of a sub-optimal quickest route.

Tele Atlas have developed a system in which GPS data is uploaded from PND's and used to provide speed parameters for segments of the map data which aims to provide speed parameters which show the true speed on a road segment at predetermined times of a day.

SUMMARY OF THE INVENTION

According to a first aspect of the invention there is provided a server arranged to process GPS data to generate map data comprising a plurality of navigable segments representing segments of a navigable route in an area covered by a map, the server connected with a wireless telecommunications transceiver arranged to receive GPS fixes by wireless telecommunication from a plurality of navigation devices and send the received GPS fixes to the server, the server comprising a processor arranged to generate at least one speed profile for each segment from the GPS fixes from at least two of the plurality of navigation devices, each speed profile comprising an expected speed of travel through the segment, and the server arranged to subsequently cause the transceiver to send the speed profiles to the navigation devices.

The server may be advantageous because it allows the speed profiles associated with each navigable segment in the area covered by the map data to be up-dated wirelessly, in particular the map data on the navigation devices can be up-dated in "real-time", i.e. while the navigation device is providing instructions for a determined route. Real-time updates of the map data may provide the navigation device with a better indication of the traffic flow along that road segment than the old map data, which may well increase the accuracy of routing algorithms to determine a journey across the area represented by the map data.

The speed profile may be an average speed of travel of navigation devices, including the plurality of navigation devices, through the segment. The speed profile may be an average speed that navigation devices have travelled through the segment in a predetermined time period, for example during the last hour. In this way, the speed profile may provide an indication of the current traffic behaviour.

According to a second aspect of the invention there is provided a method of processing GPS data to generate map data comprising a plurality of navigable segments representing segments of a navigable route in an area covered by the map, the method comprising transmitting GPS fixes from a plurality of navigation devices by wireless telecommunication to a processor, causing a processor to generate at least one speed profile for each segment from the GPS fixes from at least two of the plurality of navigation devices, each speed profile comprising an expected speed of travel through the segment, and sending the speed profiles to the navigation devices by wireless telecommunications.

According to a third aspect of the invention there is provided a navigation device for determining a route across an area, the navigation device comprising a wireless telecommunications transceiver, memory having stored thereon map data comprising a plurality of navigable segments representing segments of a navigable route in the area covered by the map data, at least one of the navigable segments has associated therewith a speed profile, and a processor arranged to calculate a navigable route using the map data and, in response to at least one updated speed profile being received via the transceiver and if the navigation device is providing routing instructions for the calculated navigable route, recalculate the navigable route using the at least one updated speed profile.

The navigation device may be advantageous as the determined navigable route is recalculated to take into account any changes in the speed profiles for segments of the map data on which the route is based. This may increase the accuracy of routing algorithms to determine a journey across the area represented by the map data.

The navigation device may comprise a positioning device for determining position fixes for the navigation device, the processor arranged to send the position fixes to a server over a telecommunications network via the transceiver such that the server can identify routes the navigation device has travelled. The positioning device may be a GPS device that generates GPS fixes. In this way, the navigation device can provide position data to the server on the move. This may allow the server to calculate speed profiles that are representative of the current traffic behaviour.

The processor may be arranged to identify segments within a predetermined distance of a current position of the navigation device and to change the speed profile for the identified segments to the or one of the updated speed profiles. The predetermined distance may be segments within a particular area around the navigation device, for example a substantially rectangular or circular shaped area around the navigation device. The distance between the navigation device and an edge of the area may be of the order of tens or hundreds of kilometers, preferably between 50 and 200 km. The processor may not change the speed profiles of segments outside of the predetermined distance of the current position of the navigation device to the updated speed profile. By the processor only changing the speed profiles for segments within a predetermined distance of the navigation device, the amount of processing that is required is reduced relative to changing all of the speed profiles. Only changing the speed profiles for segments within a predetermined distance of the navigation device may not affect the accuracy of the route determined as a vehicle/person with which the navigation device is travelling is unlikely to travel to segments outside of the predetermined distance during the time which the updated speed profile is relevant.

For example, the updated speed profile may be provided to take account of a sudden drop in average speeds through segments due to an accident and the navigation device only needs to change the speed profile for the effected segments if the navigation device will travel on those segments whilst they are affected by the accident. It is likely that if the navigation device is in a vehicle, such as a car, the effects of an accident on segments hundreds of kilometers from the current position of the vehicle will clear before a vehicle reaches these segments. Accordingly, if the route determined by the navigation device is for a motorised vehicle, the predetermined distance may be of the order to hundreds of kilometers, for example 100 to 200 km. If the route determined by the navigation device is for a non-motorised vehicle, such as a bicycle, then the predetermined distance may be of the order to tens of kilometers.

The processor may be arranged to determine the predetermined distance from a current speed at which the navigation device is travelling. For example, the predetermined distance may be the current speed of the navigation device multiplied by a preset time, for example one or more hours. The preset time may be a typical time for the traffic behaviour to return to normal after an unusual event, such as a traffic accident. Alternatively, the preset time may be an estimated time for which the updated profile applies sent to the navigation device, for example by the server.

In another embodiment, the predetermined distance is based on the bandwidth for the transmission of signals between the navigation device and a server that provides the updated speed profile. In this way, a balance may be automatically determined between accuracy of the speed profiles of the map data and the quantity of data sent to the navigation device. Accordingly, in one embodiment, the navigation device may only receive updated speed profiles for segments within the predetermined distance of the current position of the navigation device.

According to a fourth aspect of the invention there is provided a navigation device for the determination a route, the navigation device comprising a wireless telecommunications transceiver, memory having stored thereon map data, a GPS receiver and a processor arranged to send GPS fixes obtained by the GPS receiver to a server via the wireless telecommunication transceiver and calculate navigable routes using the map data, on request from a user.

In this way, the navigation device can provide GPS fixes to a server in real-time, or at least pseudo real time, such that a server can calculate speed profiles for map data and the device can calculate navigable routes.

According to a fifth aspect of the invention there is provided a data carrier containing instructions, which when read by a processor of a server, the server comprising a wireless telecommunications transceiver and the processor, cause the processor to operate in accordance with the first aspect of the invention.

According to a sixth aspect of the invention there is provided a data carrier containing instructions, which when read by a processor of a navigation device cause the navigation device to operate in accordance with the third or fourth aspects of the invention.

The navigable segments generally represent segments of a road but may also represent segments of any other path, channel or the like navigable by a vehicle, person or the like. For example, a navigable segment may represent a segment of a path, river, canal, cycle path, tow path, rail way line, or the like.

Reference is made herein to speed data being associated with a road segment. The skilled person will appreciate that each road segment is represented by data within the map data providing the map. In some embodiments, such data representing the road segment may include an identifier which provides a reference to the speed data. For example the reference may provide a reference to a generated speed profile. This reference may be provided in the form of a look-up table.

In any of the above aspects of the invention the machine readable medium may comprise any of the following: a floppy disk, a CD ROM, a DVD ROM/RAM (including a −R/−RW and +R/+RW), a hard drive, a memory (including a USB memory key, an SD card, a Memorystick™, a compact flash card, or the like), a tape, any other form of magneto optical storage, a transmitted signal (including an Internet download, an FTP transfer, etc), a wire, or any other suitable medium.

BRIEF DESCRIPTION OF THE DRAWINGS

At least one embodiment of the invention will now be described, by way of example only, with reference to the accompanying drawings, in which.

DETAILED DESCRIPTION OF EMBODIMENT OF THE INVENTION

Figure 1:
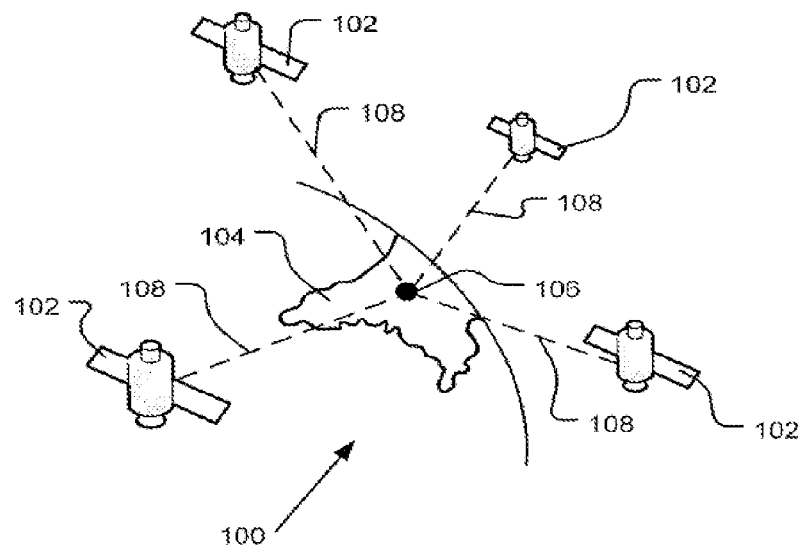
FIG. 1 is a schematic illustration of an exemplary part of a Global Positioning System (GPS) usable by a navigation device.

Throughout the following description identical reference numerals will be used to identify like parts.

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, rail way line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2A:
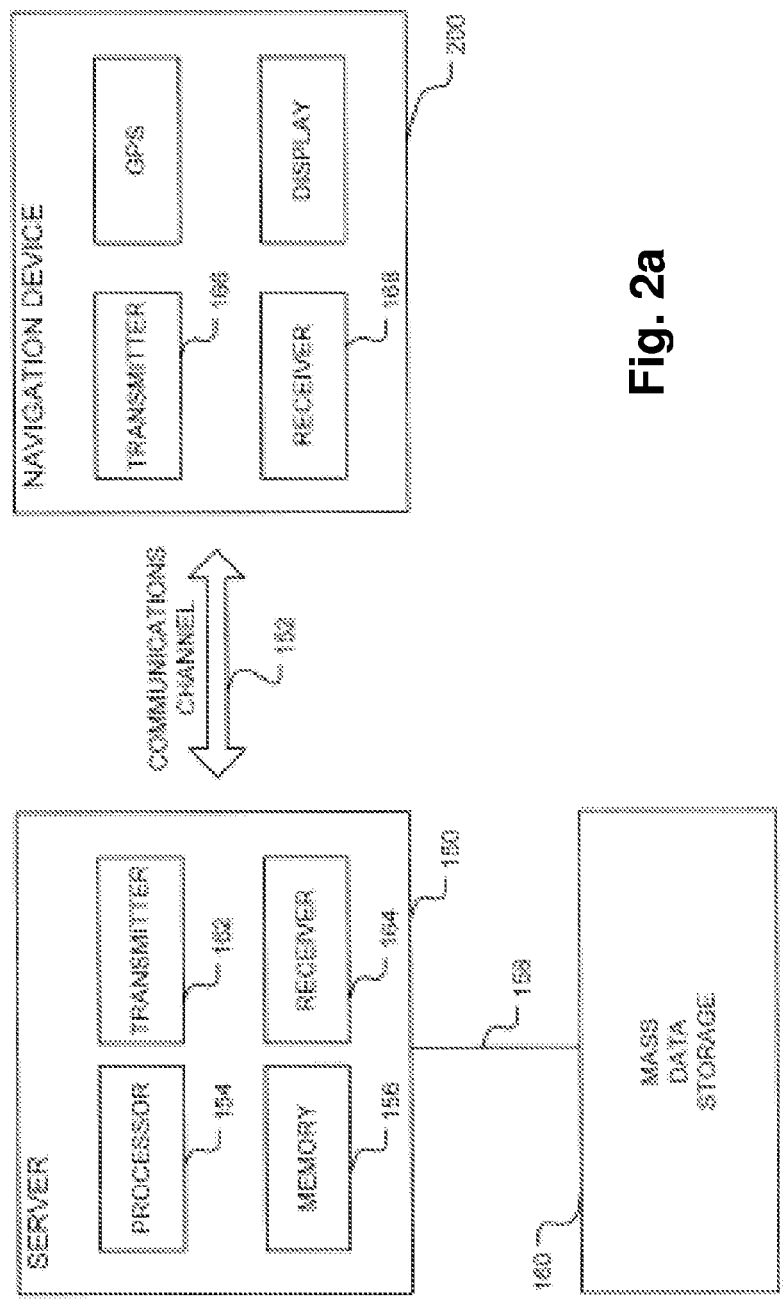
FIG. 2a is a schematic diagram of a communications system for communication between a navigation device and a server.

Turning to FIG. 2a, a navigation device 200 (ie a PND) comprising a positioning device, in this embodiment a GPS receiver device 106, and a wireless transceiver, comprising transmitter 165 and receiver 168, capable of establishing a data session with network hardware of a telecommunications network, such as a cellular network. The wireless communication may be infrared communications, radio frequency communications, such as microwave frequency communications, satellite communication, etc.

Thereafter, through the telecommunications network, the device 200 can establish a communication channel 152 (which also may involve other networks in addition to the telecommunications network, such as the Internet for example) with a server 150. As such, a wireless network connection can be established between the navigation device 200 (which can be, and often times is, mobile as it travels alone and/or in a vehicle) and the server 150 to provide a "real-time" or at least very "up to date" gateway for information.

The navigation device 200 may utilise "mobile phone technology" within the navigation device 200, such as an inbuilt GPRS modem, and can include internal components, and/or an insertable card (e.g. Subscriber Identity Module (SIM) card), complete with necessary mobile phone technology and/or an antenna.

The establishing of the network connection between the navigation device 200 and the server 150, using the Internet for example, can be done in a known manner. In this respect, any number of appropriate data communications protocols can be employed, for example the TCP/IP layered protocol. Furthermore, the navigation device can utilize any number of communication standards such as CDMA2000, GSM, IEEE 802.11 a/b/c/g/n, etc.

The communication channel 152 is not limited to a particular telecommunications communication technology. Additionally, the communication channel 152 is not limited to a single wireless communication technology; that is, the channel 152 may include several communication links that use a variety of technology. For example, the communication channel 152 can be adapted to provide a path for electrical, optical, and/or electromagnetic communications, etc as well as the wireless communication. Furthermore, the communication channel 152 can include intermediate devices such as routers, repeaters, buffers, transmitters, and receivers, for example.

In one illustrative arrangement, the communication channel 152 includes telephone and computer networks.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2a. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via the wireless connection. For many dynamic calculations, the processor 154 in the server 150 may be used to handle the bulk of processing needs, however, a processor (not shown in FIG. 2a) of the navigation device 200 can also handle much processing and calculation, oftentimes independent of a connection to a server 150.

Figure 2B:
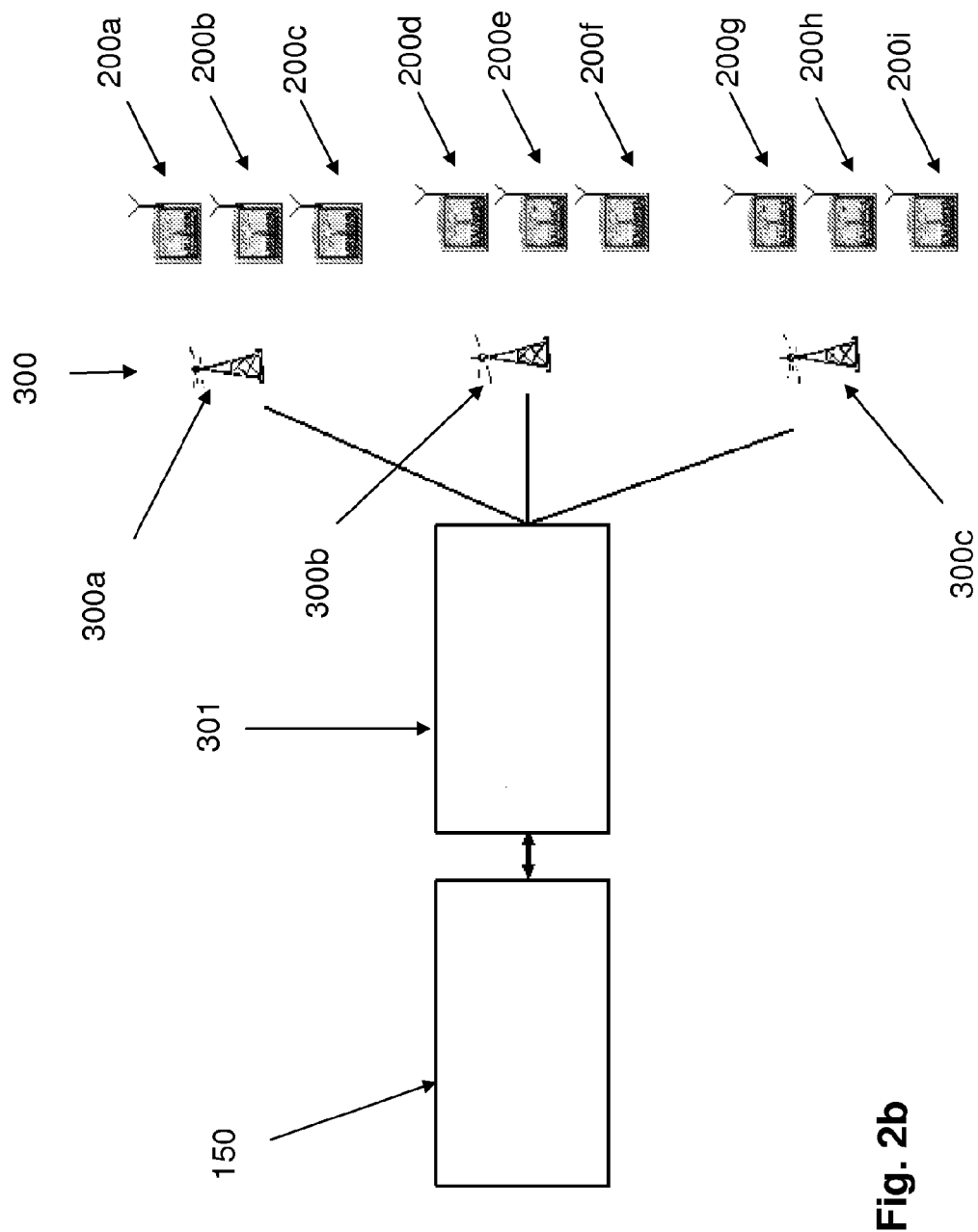
FIG. 2b is a schematic diagram of a communication system for communication between a plurality of navigation devices and a server.

Referring to FIG. 2b, the server 150 is arranged to communicate with a plurality of navigation devices 200a to 200i over, in this embodiment, a cellular telecommunications network 300 and the Internet 301. Each navigation device 200a to 200i corresponds to the navigation device 200, described with reference to FIG. 2a, and has a GPS receiver for obtaining GPS position fixes. In this embodiment, the navigation devices 200a to 200i communicate with base stations 300a to 300c of a telecommunications network 300 and these base stations 300a to 300c subsequently pass signals received from the navigation servers 200a to 200i to server 150 via the Internet 301. Equally, the server 150 is capable of sending signals to each of the navigation devices 200a to 200i via the Internet 301 and an appropriate base station 300a to 300c.

Figure 3:
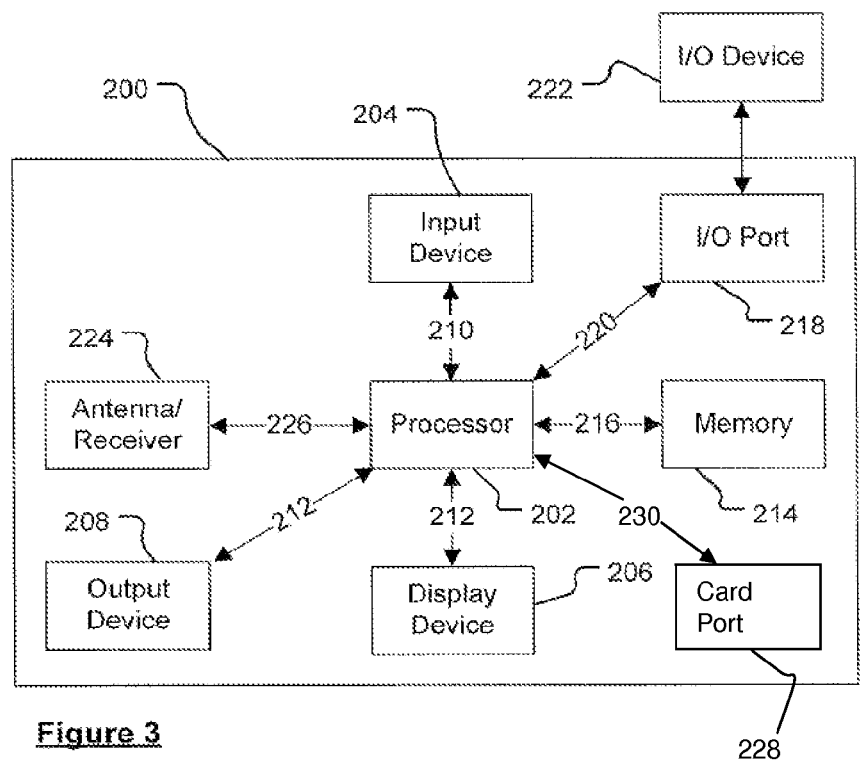
FIG. 3 is a schematic illustration of electronic components of the navigation device of FIG. 2a or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touch-screen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example.

The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks™, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
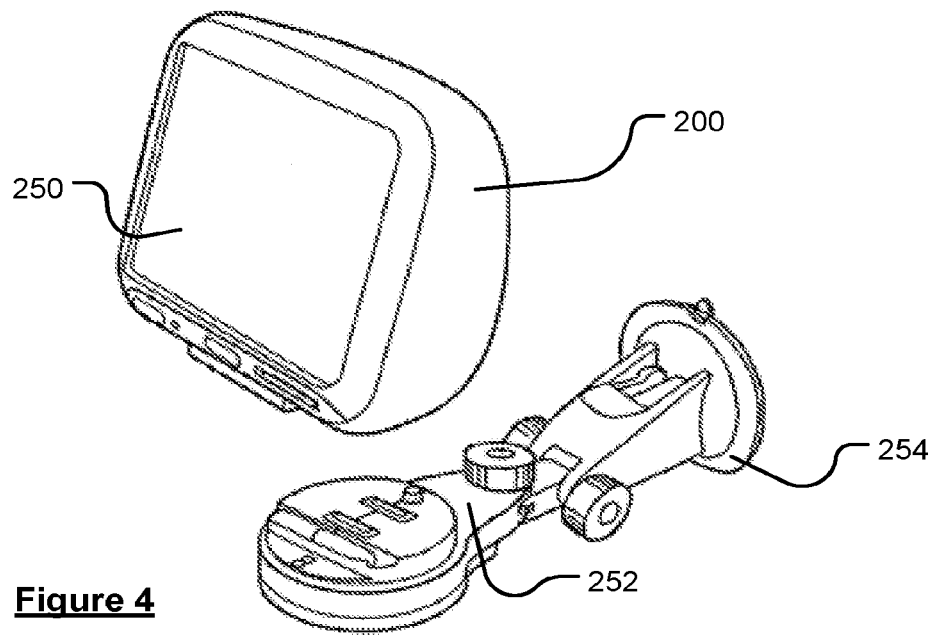
FIG. 4 is a schematic diagram of an arrangement of mounting and/or docking a navigation device.

Referring to FIG. 4, the navigation device 200 may be a unit that includes the integrated input and display device 206 and the other components of FIG. 2a (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked.

The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Figure 5:
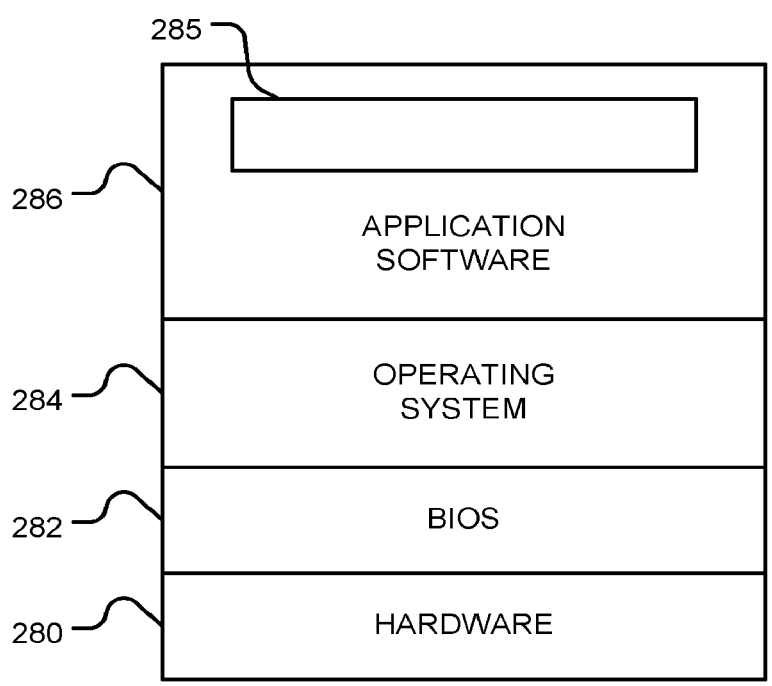
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

The navigation device 200 is arranged such that the user can download map data into memory 214 or the memory card in card port 228. The map data comprises a plurality of navigable segments representing segments of a navigable route in the area covered by the map data, each of the navigable segments having associated therewith a speed profile. Each speed profile may comprise a plurality of average speeds through the segment for different weekly recurring time periods. The processor 202 of the navigation device 200 is arranged to determine a navigable route requested by a user using the map data and this navigable route may be based on the speed profiles. For example, the processor 202 may use the speed profiles to determine the fastest route and/or an estimate of the time of travel along the route.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; ie it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; ie as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (ie the GPS data and the time stamp) to the server 150 via communication channel 152 including the wireless cellular network 300. The processor 202 is arranged to upload the record of the whereabouts on a substantially real time basis, although this may inevitably mean that data is in fact transmitted from time to time with a relatively short period between the transmissions, such as every 5, 10, 20, 30, 40, 50 seconds, minute, etc or any time between these times, and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214/card within the port 228.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200a to 200i which have uploaded data. From these records the server 150 is arranged to generate speed profiles, as now described.

As discussed above, the mass data storage 160 also contains map data. Such map data provides information about the location of road segments, points of interest and other such information that is generally found on map.

Figure 6:
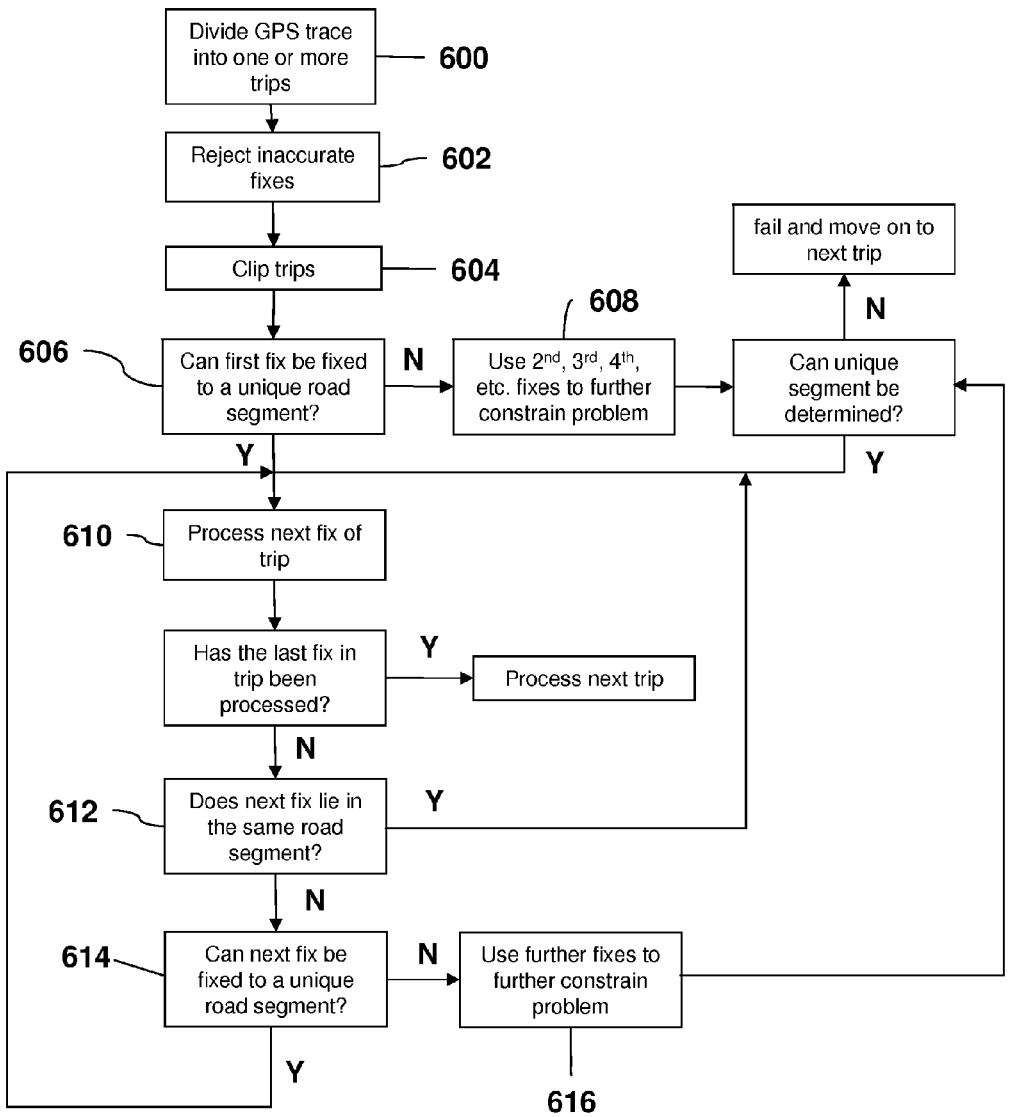
FIG. 6 shows a flowchart outlining an embodiment for matching GPS fixes within a trace to a map.

As a first process, the server 150 is arranged to perform a map matching function between the map data and the GPS fixes contained within the records of the whereabouts that have been received and such a process is described in relation to FIG. 6. Such map matching may be performed in a so-called real time manner; ie as the records of whereabouts are received or may be performed a time later after the records of the whereabouts have been recalled from the mass data storage 160.

In order to increase the accuracy of the map matching, pre-processing of the records of the whereabouts is performed as follows. Each GPS trace (ie a 24 hour period of GPS data) is divided 600 into one or more trips with each trip representing a single journey of the navigation device 200 which are subsequently stored for later processing.

Within each trip GPS fixes whose accuracy report received from the navigation device is not sufficiently high are rejected 602. Thus, in some embodiments, a fix may be rejected if the accuracy report indicates that the signals from less than three satellites 102 were being received by the navigation device 200 in relation to that GPS fix. Further, each trip is clipped 604 when the reported time between fixes goes above a threshold value. Each trip that passes this pre-processing stage is passed to be map matched.

In this context, a clipped trip is a trip in which the there is a predetermined time period between consecutive GPS fixes of greater than a predetermined time. As such, it might be inferred that the vehicle has remained stationary and as such it should be considered a first trip has ended and a second trip has commenced. Thus, a clipped trip becomes two separate trips.

However, before a trip is divided a check is made as to whether the position of the vehicle has changed between the last two fixes since a gap above the predetermined time between GPS fixes may also result from a loss of GPS signal and in such circumstances, the trip is not divided. In the embodiment being described, the predetermined time is roughly 3 minutes. However, the skilled person will appreciate that the gap may be any other suitable time, such as roughly any of the following: 15 seconds, 30 seconds, 1 minute, 90 seconds, 2 minutes, 5 minutes, 10 minutes or any time in between these. As discussed hereinafter, if the average speed of a navigation device 200 from which the GPS fixes are sent is below a predetermined threshold then data, may in some embodiments, be rejected in later processing. Such an embodiment can be useful in that it can remove data relating to so-called stop-start traffic which occurs after incidents such as a crash or the like which may leave remaining data more representative of steady state traffic flow.

Then, each trip is taken in turn and fixes within that trip are matched to a map from within the map data. Each map comprises a plurality of road segments along which it is possible to travel with each segment being represented within the map as a straight vector.

The program code running on the processor 154 of the server 150 provides a map matcher that is arranged to step over the or each fix in the trip that is being processed until it finds a fix which lies within a segment or is sufficiently close to a segment in order for it to be assumed to have occurred on that segment (ie it is within a distance threshold of the segment). This threshold allows for less than 100% GPS accuracy and the compressing effect of splitting the road into a set of straight vectors.

Each trip has an initial fix (ie the first fix within the trip) which is harder to associate with a segment than other fixes within the trip since there are no segments that have already identified which can be used to constrain the selection of the segments. If, for this first fix, multiple segments are within the threshold 606, then the algorithm looks to the next GPS fix (ie the 2nd fix) within the trip and generates a set of roots from those multiple segments based on the possible travel as a function of the distance between the 2 fixes (ie between the 1st and 2nd fixes). If the 2nd fix does not lead to a unique candidate segment for the 1st fix, then the algorithm moves to the 3rd fix within the trip and again generates and compares the possible routes to try and provide a unique candidate for the first fix 608. This process may continue until the remaining GPS fixes within a trip have been processed.

An advantage of such an embodiment is that although any one first fix in isolation may be near multiple segments, and in isolation these segments can not be distinguished between, it becomes possible using the further travel (ie the 2nd and 3rd fixes) to determine the identity of the segment with which the first fix is associated. Thus, a first segment for a trip is determined by the map matcher.

Once the first segment has been identified for a trip, further fixes are processed in order to identify further segments. It is of course possible that the next fix of the trip lies within the same segment as the first fix 612.

Thus, the subsequent fixes of a trip are processed 610 to determine if they are within the distance threshold of the segment, and the map matcher is arranged to associate that segment with each of the fixes that lie within the distance threshold. When the map matcher process a fix that is outwith the distance threshold it is arranged to generate a new set of candidate segments for that fix. However, it is now possible to add a further constraint that the next segment is one which is connected to the end of the one which has just been processed. These neighbouring segments are obtained by the map matcher from the underlying map data.

If at any point the map matcher fails to identify a segment for a given fix that follows on from the previous segment, either because there are no segments within a threshold, or it cannot uniquely identify a single segment, then the map matcher is arranged to step through subsequent fixes 616 in order to further constrain the journey until it can identify a segment that is a unique match. That is, if the nth fix cannot be uniquely associated with a segment the nth+1 segment is used to further constrain the identification of a segment. If the nth+1 fix does not produce a unique segment then the nth+2 fix is used. In some embodiments, this process may carry on until the a unique segment is identified or all of the GPS fixes with a trip have been processed.

The map matcher is arranged to try and uniquely identify segments; in the embodiment being described, it does not attempt to create a continuous route, only to try and match segments to fixes. In other embodiments, it may be desirable to try and have the map matcher generate continuous routes.

Therefore, at the end of the process that the map matcher is arranged to perform, a series of road segments are obtained along which the navigation device 200 has travelled in the trip being analysed. Subsequently, the map matcher further processes these road segments and assigns, from the GPS fixes, an ingress time and also a transit time for that segment. These assigned times are stored within the mass data storage 160 for later processing. It may well be that a plurality of GPS fixes are stored for each road segment. However, regardless of whether how many GPS fixes are associated with each segment, the ingress time, GPS fixes and the length of the segment (which in this embodiment is stored within the map data) are used to calculate the average speed for that segment of road. This average speed is then stored within the mass data storage 160 associated with the relevant assigned times and that segment. Information relating to a speed of traffic flow on a road segment and assigned to a road segment may be thought of as being speed data for that road segment.

The server 150 is further arranged to run averaging program code on the processor 154 to provide an averager which processes the assigned times to generate one or more averages therefrom as described below. The averaging process used in this embodiment is now described.

In a first step of the process, the averager groups the average speeds for each road segment on the map based on the time in which that average speed occurred, such as the last 5 minutes, 10 minutes, 15 minutes, 30 minutes, or any time in between these times.

Before an average speed generated from a trip is grouped into a predetermined time period it is screened to try and increase data quality. In this embodiment, the average speed is only added to the group for the predetermined period if the average speed falls within a predetermined range. In this embodiment, the method excludes speeds which exceed a maximum predetermined threshold (which may be roughly 180 km/h) and further, the method excludes speeds which fall below a predetermined amount of the average speed for that segment in that predetermined time period (which may for example be 2 km/h). In other embodiments, the max permitted speed may be set as the speed limit for that segment of road, but the skilled person will appreciate that such information can be inaccurate in map data that is being processed and also that the speed limit for a segment of road may in fact not give an accurate indication of traffic conditions.

A predetermined time after a set time period has passed, for example, immediately after a set time period has passed, an average speed is calculated for each road segment for the set time period. There are several options for computing the average speed: using plain arithmetic or harmonic means or computing the median.

Thus, in the embodiment being described and for the map being processed there is generated for each segment of road on the map average speeds for the set time period that has recently passed. It will be appreciated that, in fact, not all road segments will necessarily have an average speed assigned thereto for every set time period since some roads may be traversed infrequently, particularly at unsociable times such as the early hours of the morning.

However, before the average speeds per segment are used quality checks are performed. In some embodiments, the average is rejected if there are fewer than 5 values that went to make up that average. Other embodiments may of course use different values, such as 2, 3, 4, 6, 7, 8, 10, 20 or more or any value in between these.

Also, a further check on the quality of the average is performed and for each average the standard deviation of the average is divided by the square root of the number of data samples that went to make up the average for that segment for that time period. If the result of this calculation is outside a predetermined threshold then that average is again rejected leaving a gap for that segment for that time period.

Further quality checks may be implemented to reject averages on any of the following: whether the deviation in the data is beyond a predetermined threshold; the existence of more than a predetermined number of outliers beyond a predetermined threshold. The skilled person will appreciate such statistical techniques to ensure the quality of the data.

The set of averages for any given road segment may be thought of as a measured speed profile for that road segment.

The skilled person will appreciate that if a measured speed profile for a road segment has few missing speed values (ie all or at least the majority of the predetermined time periods have a value) then that segment may be processed and the missing values are therefore masked.

Each average that passes these quality checks is considered trustworthy and is approved for use in the map data. The server 150 then sends these updated speed profiles to the navigation devices 200a to 200i via the communication channel 152.

Before sending the updated speed profiles to the navigation devices 200a to 200i, the processor of the server 150 may check to see how different the updated speed profiles are from the current speed profiles of the map data being used by the navigation devices 200. If the difference is above a predetermined threshold, then the updated speed profile is sent to the navigation devices, however, if it is not, then the updated speed profile is not sent to the navigation devices. This may help to reduce unnecessary processing and utilization of the available bandwidth.

In another embodiment, the speed profiles are not average speeds through a segment during a recent set period but are delays added to the current speed profiles, for example the average speed of the current speed profile minus a predicted speed differential, such as 5, 10, 15, 20, etc km/h. The predicted speed differential may be calculated using conventional algorithms as are known to the man skilled in the art.

On receiving the updated speed profiles, the navigation device 200 changes at least some of the speed profiles of the map data stored in memory 214 or a memory card in card port 228 to the updated speed profiles. In this way, speed profiles of the map data are updated in pseudo real time such that the map data stored on the navigation device gives a more accurate reflection of the current traffic conditions.

If the navigation device is providing routing instructions for a calculated navigable route, the processor 202 may recalculate the navigable route using the updated speed profiles. In this way, the navigation device 200 may provide routes that automatically adapt to changes in the average speed of travel through segments of a navigable route.

In one embodiment, the processor 202 of the navigation device 200 does not utilise all of the updated speed profiles received from the server 150 but only changes the speed profiles for segments within a predetermined distance of a current position of the navigation device 200. For example, the processor 202, on receiving updated speed profiles may identify segments within a predetermined distance of a current position of the navigation device and changes the speed profile for each of the identified segments to an updated speed profile, if an updated speed profile has been received for that segment. The speed profiles of segments that fall outside the predetermined distance remain unchanged. The predetermined distance may be segments within a particular area around the navigation device, and in the case of a navigation device being used for directing a vehicle, the predetermined distance may be between 50 and 200 km.

For navigation devices that are adaptable to provide navigable routes for various forms of transport, such as walking, cycling, etc, in addition to motor vehicles, the processor 202 of the navigation device 200 may determine the predetermined distance from a current speed at which the navigation device is travelling. For example, the predetermined distance may be the current speed of the navigation device multiplied by a preset time, for example one or more hours.

In another embodiment, the predetermined distance is based on the bandwidth for the transmission of signals between the navigation device and a server that provides the updated speed profile.

In this embodiment, the updated speed profiles are temporarily held in the navigation device 200 for a predetermined length of time, such as 1 hour and, after which the navigation device 200 changes the speed profile back to the original speed profile or a further updated speed profile. The updated speed profile determined from a recent set time period may provide a better representation of the current traffic conditions for a brief period after the set time period but it is likely that, unless further updated speed profiles are received, the original speed profile, which is based on average speed calculated over a number time periods rather than a single time period, will give a better representation of the traffic conditions at a much later times, such as 1, 2 or 3 hours after the set time period.

Figure 7:
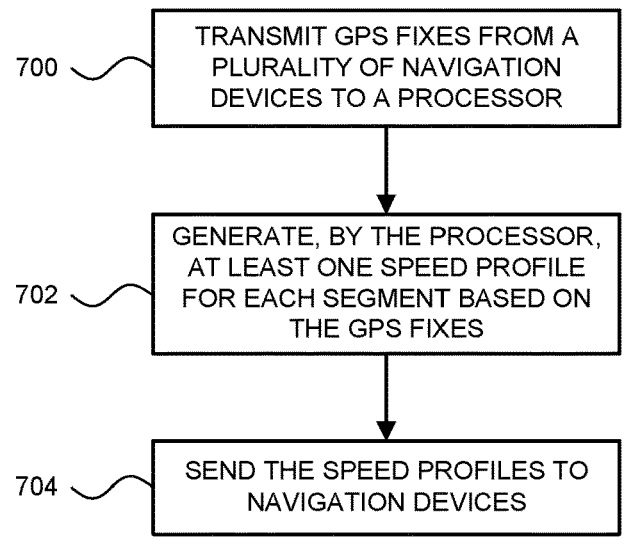
FIG. 7 shows a flowchart outlining an embodiment for generating speed profiles.

Some embodiments perform a method of processing GPS data to generate map data comprising a plurality of navigable segments representing segments of a navigable route in an area covered by the map. FIG. 7 shows a flowchart outlining an embodiment for generating speed profiles based on processed GPS data. As can be seen in FIG. 7, the method comprises transmitting GPS fixes from a plurality of navigation devices by wireless telecommunication to a processor 700. The processor then generates at least one speed profile for each segment from the GPS fixes from at least two of the plurality of navigation devices 702, each speed profile comprising an expected speed of travel through the segment. The processor next sends the speed profiles to the navigation devices by wireless telecommunications 704. In some embodiments, sending the speed profiles comprises sending only speed profiles that differ from speed profiles currently being used by the navigation device by more than corresponding predetermined thresholds.

Figure 8:
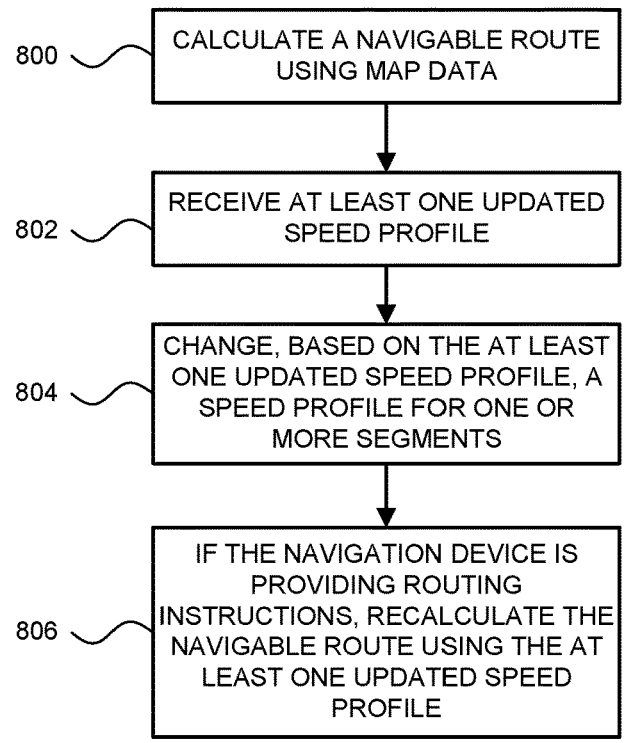
FIG. 8 shows a flowchart outlining an embodiment for using updated speed profiles.

Some embodiments perform a method for determining a route across an area using a navigation device, the navigation device comprising a wireless telecommunications transceiver, memory having stored thereon map data comprising a plurality of navigable segments representing segments of a navigable route in the area covered by the map data, at least one of the navigable segments has associated therewith a speed profile. FIG. 8 shows a flowchart outlining an embodiment for using updated speed profiles. As can be seen in FIG. 8, the method comprises calculating a navigable route using the map data 800. Next, in response to at least one updated speed profile being received via the transceiver 802, changing, based on the at least one updated speed profile, a speed profile for one or more segments 804. For example, the changing may include identifying one or more segments within a predetermined distance of a current position of the navigation device and changing the speed profile for the one or more segments within the predetermined distance based on the at least one updated speed profile, but leaving speed profiles of segments outside the predetermined distance unchanged. Then, if the navigation device is providing routing instructions for the calculated navigable route, recalculating the navigable route using the at least one updated speed profile 806.

The skilled person will appreciated that an apparatus provided to execute a method as described herein may comprise hardware, software, firmware or any combination of two or more of these.

The skilled person will appreciate that, whilst the term GPS data has been used to refer to position data derived from a GPS global positioning system as for example described in relation to FIG. 1, other position data could be processed in a manner similar to the methods as described herein. Thus, term GPS data may be replaceable with the phrase positioning data. Such position information could for example be derived from position information derived from mobile phone operation, data received at toll barriers, data obtained from induction loops embedded in roads, data obtained from number plate recognition system or any other suitable data.

The invention claimed is:

1. A method of operating a server comprising a processor and memory having map data stored thereon, said map data comprising a plurality of navigable segments which may be selected to define a navigable route in an area covered by the map data, at least some of the navigable segments having a speed profile associated therewith, the speed profile comprising an expected speed of travel through the segment for different recurring time periods, the method comprising:
   obtaining position data received by wireless telecommunication from a first plurality of navigation devices;
   causing the processor to generate an updated speed profile indicative of current traffic behaviour for at least one segment by processing the position data from at least two of the first plurality of navigation devices; and
   for each navigation device of a second plurality of navigation devices:
      identifying, for the navigation device, one or more segments within a predetermined distance of a current position of the navigation device; and
      sending, to the navigation device, updated speed profiles only for segments identified as being within the predetermined distance.

2. The method according to claim 1, wherein the speed profile associated with a segment comprises an average speed of travel of navigation devices, including the plurality of navigation devices, through the segment for different recurring time periods.

3. The method according to claim 2, wherein the updated speed profile for a segment comprises: (i) an average speed of travel through the segment for a time period that has recently passed; or (ii) a speed differential to be added to the respective average speed of the speed profile for the segment.

4. The method according to claim 1, further comprising:
   comparing the updated speed profile for a segment with a respective average speed of the speed profile for the segment to determine if a difference is above a predetermined threshold; and
   sending only those updated speed profiles determined to have a difference above the predetermined threshold for segments identified as being within the predetermined distance.

5. The method according to claim 1, wherein sending the updated speed profiles only for segments identified as being within the predetermined distance of the navigation device comprises skipping sending updated speed profiles for segments that are not identified as being within the predetermined distance of the navigation device.

6. The method according to claim 1, further comprising selecting the predetermined distance based on a distance that a corresponding navigation device may travel in a time in which the updated speed profile is relevant.

7. The method according to claim 6, further comprising selecting the predetermined distance based at least in part on a present speed of a corresponding navigation device.

8. The method according to claim 1, further comprising selecting the predetermined distance based at least in part on a bandwidth available for sending the updated speed profiles to the second plurality of navigation devices.

9. The method according to claim 1, wherein at least some of the first plurality of navigation devices is included in the second plurality of navigation devices.

10. A non-transitory computer-readable medium storing computer software that, when executed on a processor of a server comprising memory having map data stored thereon, said map data comprising a plurality of navigable segments which may be selected to define a navigable route in an area covered by the map data, at least some of the navigable segments having a speed profile associated therewith, the speed profile comprising an expected speed of travel through the segment for different recurring time periods, causes the server to perform a method comprising:
   obtaining position data received by wireless telecommunication from a first plurality of navigation devices;
   causing the processor to generate an updated speed profile indicative of current traffic behaviour for at least one segment by processing the position data from at least two of the first plurality of navigation devices; and
   for each navigation device of a second plurality of navigation devices:
      identifying, for the navigation device, one or more segments within a predetermined distance of a current position of the navigation device; and
      sending, to the navigation device, updated speed profiles only for segments identified as being within the predetermined distance.

11. A server comprising memory having map data stored thereon, said map data comprising a plurality of navigable segments which may be selected to define a navigable route in an area covered by the map data, at least some of the navigable segments having a speed profile associated therewith, the speed profile comprising an expected speed of travel through the segment for different recurring time periods, the server connected with a wireless telecommunications transceiver configured to receive position data by wireless telecommunication from a first plurality of navigation devices and send the received position data to the server, the server further comprising a processor configured to:

generate an updated speed profile indicative of current traffic behaviour for at least one segment by processing the position data from at least two of the first plurality of navigation devices; and for each navigation device of a second plurality of navigation devices:

identifying, for the navigation device, one or more segments within a predetermined distance of a current position of the navigation device; and sending, to the navigation device via the transceiver, updated speed profiles only for segments identified as being within the predetermined distance.

12. The server according to claim 11, wherein the speed profile associated with a segment comprises an average speed of travel of navigation devices, including the plurality of navigation devices, through the segment for different recurring time periods.

13. The server according to claim 12, wherein the updated speed profile for a segment comprises: (i) an average speed of travel through the segment for a time period that has recently passed; or (ii) a speed differential to be added to the respective average speed of the speed profile for the segment.

14. The server according to claim 11, wherein the processor is further configured to:

compare the updated speed profile for a segment with a respective average speed of the speed profile for the segment to determine if a difference is above a predetermined threshold; and send only those updated speed profiles determined to have a difference above the predetermined threshold for segments identified as being within the predetermined distance.

15. The server according to claim 11, wherein sending the updated speed profiles only for segments identified as being within the predetermined distance of the navigation device comprises skipping sending updated speed profiles for segments that are not identified as being within the predetermined distance of the navigation device.

16. The server according to claim 11, wherein the processor is configured to select the predetermined distance based on a distance that a corresponding navigation device is predicted to may travel in a time in which the updated speed profile is relevant.

17. The server according to claim 16, wherein the processor is configured to select the predetermined distance based at least in part on a present speed of a corresponding navigation device.

18. The server according to claim 11, wherein the processor is configured to select the predetermined distance based at least in part on a bandwidth available for sending the updated speed profiles to the second plurality of navigation devices.

19. The server according to claim 11, wherein at least some of the first plurality of navigation devices is included in the second plurality of navigation devices.

\* \* \* \* \*